(12) United States Patent
Welton et al.

(10) Patent No.: US 8,720,558 B2
(45) Date of Patent: May 13, 2014

(54) VISCOSIFIED FLUIDS FOR REMEDIATING SUBTERRANEAN DAMAGE

(75) Inventors: Thomas D. Welton, Duncan, OK (US); Richard W. Pauls, Duncan, OK (US); David E. McMechan, Duncan, OK (US); John M. Terracina, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 168 days.

(21) Appl. No.: 13/433,686

(22) Filed: Mar. 29, 2012

(65) Prior Publication Data

US 2012/0181027 A1      Jul. 19, 2012

Related U.S. Application Data

(62) Division of application No. 11/805,359, filed on May 22, 2007.

(51) Int. Cl.
*E21B 43/26* (2006.01)
*E21B 37/00* (2006.01)

(52) U.S. Cl.
USPC .................. 166/281; 166/305.1; 166/312

(58) Field of Classification Search
None
See application file for complete search history.

(56) References Cited

U.S. PATENT DOCUMENTS

| | | | |
|---|---|---|---|
| 5,016,714 A * | 5/1991 | McCabe et al. | 166/308.1 |
| 6,138,760 A * | 10/2000 | Lopez et al. | 166/300 |
| 6,267,186 B1 * | 7/2001 | Hayatdavoudi | 175/64 |
| 8,413,721 B2 * | 4/2013 | Welton et al. | 166/312 |
| 2005/0124500 A1 * | 6/2005 | Chen et al. | 507/200 |
| 2005/0139354 A1 * | 6/2005 | Salamat | 166/278 |
| 2007/0287638 A1 * | 12/2007 | Plank et al. | 507/209 |
| 2009/0008095 A1 * | 1/2009 | Duncum et al. | 166/292 |

* cited by examiner

*Primary Examiner* — Angela M DiTrani
(74) *Attorney, Agent, or Firm* — McDermott Will & Emery LLP; Craig W. Roddy

(57) ABSTRACT

Methods for remediating a subterranean formation can comprise: introducing a first remedial fluid into a first portion of a subterranean formation, wherein the first remedial fluid comprises a base fluid and a viscosifying agent; and allowing the first remedial fluid to divert at least a portion of a second remedial fluid that comprises an oxidizer to a second portion of the subterranean formation; wherein the viscosifying agent comprises at least one viscosifying agent selected from the group consisting of a gelling agent, an emulsifier, or a gas in combination with a foaming agent; and wherein the gelling agent, if present, comprises at least one polymer selected from the group consisting of xanthan, diutans, wellans, succinoglycan, clarified biopolymers, scleroglycan, combinations thereof, and derivatives thereof.

15 Claims, No Drawings

VISCOSIFIED FLUIDS FOR REMEDIATING SUBTERRANEAN DAMAGE

BACKGROUND

This application is a divisional of U.S. patent application Ser. No. 11/805,359, filed on May 22, 2007, entitled "Viscosified Fluids for Remediating Subterranean Damage," and published as US 2008/0289827.

The present invention relates to fluids useful in subterranean operations, and more particularly, to viscosified fluids for use in remediating damage in a subterranean formation.

Treatment fluids may be used in a variety of subterranean treatments, including, but not limited to, stimulation treatments and sand control treatments. As used herein, the term "treatment," or "treating," refers to any subterranean operation that uses a fluid in conjunction with a desired function and/or for a desired purpose. The term "treatment," or "treating," does not imply any particular action by the fluid or any particular component thereof.

One common production stimulation operation that employs a treatment fluid is hydraulic fracturing. Hydraulic fracturing operations generally involve pumping a treatment fluid (e.g., a fracturing fluid) into a well bore that penetrates a subterranean formation at a sufficient hydraulic pressure to create or enhance one or more cracks, or "fractures," in the subterranean formation. "Enhancing" one or more fractures in a subterranean formation, as that term is used herein, is defined to include the extension or enlargement of one or more natural or previously created fractures in the subterranean formation. The treatment fluid may comprise particulates, often referred to as "proppant particulates," that are deposited in the fractures. The proppant particulates, inter alia, may prevent the fractures from fully closing upon the release of hydraulic pressure, forming conductive channels through which fluids may flow to the well bore. The proppant particulates also may be coated with certain types of materials, including resins, tackifying agents, and the like, among other purposes, to enhance conductivity (e.g., fluid or gas flow) through the fractures in which they reside. Once at least one fracture is created and/or enhanced and the proppant particulates are substantially in place, the treatment fluid may be "broken" (i.e., the viscosity of the fluid is reduced), and the treatment fluid may be recovered from the formation.

Other common production stimulation operations that employ treatment fluids are acidizing operations. Where the subterranean formation comprises acid-soluble components, such as those present in carbonate and sandstone formations, stimulation and/or damage removal is often achieved by contacting the formation with a treatment fluid that comprises an acid. For example, where hydrochloric acid contacts and reacts with calcium carbonate in a formation, the calcium carbonate is consumed to produce water, carbon dioxide, and calcium chloride. After acidization is completed, the water and salts dissolved therein may be recovered by producing them to the surface (e.g., "flowing back" the well), leaving a desirable amount of voids (e.g., wormholes) within the formation, which may enhance the formation's permeability and/or increase the rate at which hydrocarbons subsequently may be produced from the formation. One method of acidizing known as "fracture acidizing" comprises injecting a treatment fluid that comprises an acid into the formation at a pressure sufficient to create or enhance one or more fractures within the subterranean formation. Another method of acidizing known as "matrix acidizing" comprises injecting a treatment fluid that comprises an acid into the formation at a pressure below that which would create or enhance one or more fractures within the subterranean formation.

Treatment fluids are also utilized in sand control treatments, such as gravel packing. In "gravel-packing" treatments, a treatment fluid suspends particulates (commonly referred to as "gravel particulates"), and deposits at least a portion of those particulates in a desired area in a well bore, e.g., near unconsolidated or weakly consolidated formation zones, to form a "gravel pack," which is a grouping of particulates that are packed sufficiently close together so as to prevent the passage of certain materials through the gravel pack. This "gravel pack" may, inter alia, enhance sand control in the subterranean formation and/or prevent the flow of particulates from an unconsolidated portion of the subterranean formation into a well bore. One common type of gravel-packing operation involves placing a sand control screen in the well bore and packing the annulus between the screen and the well bore with the gravel particulates of a specific size designed to prevent the passage of formation particulates. The gravel particulates act, inter alia, to prevent the formation particulates from occluding the screen or migrating with the produced hydrocarbons, and the screen acts, inter alia, to prevent the particulates from entering the well bore. The gravel particulates also may be coated with certain types of materials, including resins, tackifying agents, and the like, among other purposes, to enhance conductivity (e.g., fluid flow) through the gravel pack in which they reside. Once the gravel pack is substantially in place, the viscosity of the treatment fluid may be reduced to allow it to be recovered. In some situations, fracturing and gravel-packing treatments are combined into a single treatment (commonly referred to as "FRACPAC™" fracturing treatments). In such operations, the treatments are generally completed with a gravel pack screen assembly in place with the hydraulic fracturing treatment being pumped through the annular space between the casing and screen. In this situation, the hydraulic fracturing treatment ends in a screen-out condition, creating an annular gravel pack between the screen and casing. In other cases, the fracturing treatment may be performed prior to installing the screen and placing a gravel pack.

Maintaining sufficient viscosity in the treatment fluids used in these operations may be important for a number of reasons. Maintaining sufficient viscosity is important in fracturing and sand control treatments for particulate transport and/or to create or enhance fracture width. Also, maintaining sufficient viscosity may be important to control and/or reduce fluid loss into the formation. At the same time, while maintaining sufficient viscosity of the treatment fluid often is desirable, it may also be desirable to maintain the viscosity of the treatment fluid in such a way that the viscosity also may be reduced easily at a particular time, inter alia, for subsequent recovery of the fluid from the formation.

To provide the desired viscosity, polymeric gelling agents commonly are added to the treatment fluids. The term "gelling agent" is defined herein to include any substance that is capable of increasing by chemical means the viscosity of a fluid, for example, by forming a gel. Examples of commonly used polymeric gelling agents include, but are not limited to, guar gums and derivatives thereof, cellulose derivatives, biopolymers, and the like. The term "derivative" is defined herein to include any compound that is made from one of the listed compounds, for example, by replacing one atom in one of the listed compounds with another atom or group of atoms, ionizing one of the listed compounds, or creating a salt of one of the listed compounds. To further increase the viscosity of a treatment fluid, often the polymeric gelling agent is crosslinked with the use of a crosslinking agent. Conventional crosslinking agents may comprise a borate ion, a metal ion, or the like, and interact with at least two gelling agent molecules to form a crosslink between them, thereby forming a "crosslinked gelling agent." Treatment fluids comprising crosslinked gelling agents also may exhibit elastic and/or viscoelastic properties, wherein the crosslinks between gelling agent molecules may be broken and reformed, allowing the viscosity of the fluid to vary with certain conditions such as temperature, pH, and the like.

The use of polymeric gelling agents, however, may be problematic. For instance, polymeric gelling agents may damage subterranean formations. For example, polymeric gelling agents may leave an undesirable gel residue in the subterranean formation after use, which can impact permeability. The term "damage" is defined herein to include effects from any treatment operation or natural occurrence that have a negative impact on well productivity. Factors that may impact well productivity may include fracture conductivity, gravel pack conductivity, and/or formation permeability. The term "gel damage" is defined herein to include damage resulting from any gelling agent or gel residue. Other forms of damage that may be present in a well bore or formation may be caused by the presence of one or more of asphaltenes, paraffins, bacterial slime, scale, pipe dope, grease, heavy oil, combinations thereof, and derivatives thereof.

As a result, costly remedial operations may be required to clean up the formation, fracture face, and proppant pack. As used herein the term "proppant pack" is defined to include proppant in fractures, gravel packs, frac packs, and the like. The terms "remedial operations" and "remediate" are defined herein to include a lowering of the viscosity of gel damage and/or the partial or complete removal of damage of any type from a subterranean formation. Similarly, the term "remedial fluid" is defined herein to include any fluid that may be useful in remedial operations. Thus, as used herein, the terms "treatment" and "treatment fluid(s)" do not contemplate, and are distinct from, a remedial operation and remedial fluid(s).

Existing approaches to remediating gel damage in a subterranean formation typically rely on low viscosity, approximately 1 centipoise ("cP"), aqueous based solutions of oxidizers such as sodium hypochlorite. Low viscosity remedial fluids may be problematic in some instances. For example, placement of a low viscosity remedial fluid to treat gel damage in subterranean fractures may be difficult, or coverage for gel filter cake removal by a low viscosity remedial fluid may be low. Such difficulties with fluid placement or low levels of coverage may be caused, for example, by the tendency of low viscosity fluids to leak off to a more permeable section of the formation.

To combat perceived problems associated with polymeric gelling agents, foamed treatment fluids and emulsion-based treatment fluids have been employed to minimize residual damage, but increased expense and complexity often have resulted. Other approaches to problems presented by polymeric gel damage have focused on the use of polymeric gelling agents that cause less damage to a subterranean formation. Additionally, some treatment operations employ nonpolymeric gelling agents.

SUMMARY

The present invention relates to fluids useful in subterranean operations, and more particularly, to viscosified fluids for use in remediating damage in a subterranean formation.

In one embodiment, the present invention provides a method comprising introducing a viscosified remedial fluid comprising a base fluid, a viscosifying agent, and an oxidizer into at least a portion of a subterranean formation having damage present therein so as to contact the damage with the viscosified remedial fluid; and allowing the viscosified remedial fluid to at least partially remediate the damage present in the subterranean formation.

In another embodiment, the present invention provides a method comprising introducing a first remedial fluid into a first portion of a subterranean formation, wherein the first remedial fluid comprises a base fluid and a viscosifying agent, wherein the viscosifying agent comprises at least one viscosifying agent selected from the group consisting of a gelling agent and an emulsion; and allowing the first remedial fluid to divert at least a portion of a second remedial fluid that comprises an oxidizer to a second portion of the subterranean formation.

In another embodiment, the present invention provides a method comprising introducing a viscosified remedial fluid comprising a base fluid, a first viscosifying agent, and an oxidizer into at least a portion of a subterranean formation before a treatment fluid comprising a second viscosifying agent is introduced therein, wherein the oxidizer is available to remediate damage in the subterranean formation.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to fluids useful in subterranean operations, and more particularly, to viscosified fluids for use in remediating damage in a subterranean formation.

Compositions and methods of remediating damage in a subterranean formation using viscosified remedial fluids are provided. One of the many advantages of the present invention is that viscosified remedial fluids may allow for better coverage of a portion of a subterranean formation comprising damage, and may also provide more uniform placement of the viscosified remedial fluid in a subterranean formation. The term "subterranean formation," as used herein, is defined to include a well bore, if any, that penetrates the subterranean formation. Another of the many advantages of the present invention is that the improved coverage and placement associated with viscosified remedial fluids may facilitate the remediation of the effects of treatment operations including, but not limited to, one or more of gel damage and damage resulting from asphaltenes, paraffins, bacterial slime, scale, pipe dope, grease, and heavy oil. Another of the many advantages of the present invention is that viscosified remedial fluids may tend to self divert from regions of a subterranean formation having higher permeability to regions of a subterranean formation having lower permeability.

In certain embodiments, the viscosified remedial fluids of the present invention may comprise a base fluid, a viscosifying agent, and an oxidizer. Base fluids suitable for use in the viscosified remedial fluids of the present invention may include any fluid that is compatible with the subterranean formation, the gelling agent, and the oxidizer. The base fluid may be an aqueous fluid or a nonaqueous fluid. Examples of suitable aqueous base fluids include fresh water, saltwater (e.g., water containing one or more salts dissolved therein), brine, formation brine, seawater, combinations thereof, and derivatives thereof. Generally, the water may be from any source, treated or untreated, provided that it does not contain certain concentrations of components that might adversely affect the stability and/or performance of the viscosified remedial fluids of the present invention, for example, copper ions, iron ions, or certain types of organic materials (e.g., lignin). In certain embodiments, the pH of the aqueous base fluid may be adjusted (e.g., by a buffer or other pH adjusting agent). In these embodiments, the pH may be adjusted to a specific level, which may depend on, among other factors, the type of gel damage to be treated, cross linking agents, and/or breakers included in the viscosified remedial fluid. One of ordinary skill in the art, with the benefit of this disclosure, will recognize when such pH adjustments are appropriate.

Viscosifying agents suitable for use in the viscosified remedial fluids of the present invention may comprise a gelling agent, an emulsifier, a gas component, or combinations thereof. Thus, as used herein, the term "viscosified remedial fluid" is defined to include a remedial fluid with a viscosity that has been elevated by chemical means (for example, a gel), physical means (for example, an emulsion or a foam), or both. Optionally, other additives suitable for use in conjunction with remediation of subterranean damage may be added to the viscosified remedial fluids if desired.

Suitable gelling agents for use as a viscosifying agent in the viscosified remedial fluids of the present invention include surfactant gelling agents and polymer gelling agents. The term "surfactant gelling agent" is defined herein to include any surfactant that is capable of increasing the viscosity of a fluid, for example, by forming a gel. In certain embodiments, the surfactant gelling agents in the viscosified remedial fluids of the present invention may comprise surfactants capable of forming a gel having a viscosity greater than 20 cP. One skilled in the art will recognize that other viscosities including those lower than 20 cP may be advantageous for some applications, such as when treating the damage in a propped fracture in a low permeability formation. A low viscosity fluid of 10-15 cP may be beneficial in contacting damage in the fracture itself while not leaking off to the formation adjacent to the fracture face. In certain embodiments wherein a viscosified remedial fluid of the present invention comprises a surfactant gelling agent, the viscosified remedial fluid may be broken by, among other things, heating of the fluid or dilution of the surfactant gelling agent.

In certain embodiments, a surfactant gelling agent suitable for use in the viscosified remedial fluids of the present invention may comprise a viscoelastic surfactant. Examples of a suitable viscoelastic surfactant include any viscoelastic surfactant known in the art, or any combination thereof. As used herein, the term "viscoelastic surfactant" refers to surfactants that impart or are capable of imparting viscoelastic behavior to a fluid due, at least in part, to the association of surfactant molecules to form viscosifying micelles. These viscoelastic surfactants may be cationic, anionic, nonionic, amphoteric, or zwitterionic in nature. The viscoelastic surfactants may comprise any number of different compounds, including methyl ester sulfonates (e.g., as described in U.S. Pat. No. 7,159,659 and U.S. Publication Nos. 2006/0180309A1, 2006/0180310A1, and 2006/0183646A1, the relevant disclosures of which are incorporated herein by reference), hydrolyzed keratin (e.g., as described in U.S. Pat. No. 6,547,871, the relevant disclosure of which is incorporated herein by reference), sulfosuccinates, taurates, amine oxides, ethoxylated amides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), betaines, modified betaines, alkylamidobetaines (e.g., cocoamidopropyl betaine), quaternary ammonium compounds (e.g., trimethyltallowammonium chloride, trimethylcocoammonium chloride), derivatives thereof, and combinations thereof. Additional viscoelastic surfactants suitable for use in the viscosified remedial fluids of the present invention may include those disclosed in U.S. Pat. Nos. 6,258,859 and 6,482,866, the relevant disclosures of which are herein incorporated by reference.

In addition, suitable viscoelastic surfactants may comprise a mixture of several different compounds, including but not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. Examples of suitable mixtures of an ethoxylated alcohol ether sulfate surfactant, an alkyl or alkene amidopropyl betaine surfactant, and an alkyl or alkene dimethylamine oxide surfactant are described in U.S. Pat. No. 6,063,738, the relevant disclosure of which is incorporated herein by reference. Examples of suitable aqueous solutions of an alpha-olefinic sulfonate surfactant and a betaine surfactant are described in U.S. Pat. No. 5,897,699, the relevant disclosure of which is incorporated herein by reference.

Examples of commercially-available viscoelastic surfactants suitable for use in the present invention may include, but are not limited to, MIRATAINE BET-O 30™ surfactant (an oleamidopropyl betaine surfactant available from Rhodia Inc., Cranbury, N.J.), AROMOX® APA-T surfactant (amine oxide surfactant available from Akzo Nobel Chemicals, Chicago, Ill.), ETHOQUAD® O/12 PG surfactant (fatty amine ethoxylate quat surfactant available from Akzo Nobel Chemicals, Chicago, Ill.), ETHOMEEN T/12™ surfactant (a fatty amine ethoxylate surfactant available from Akzo Nobel Chemicals, Chicago, Ill.), ETHOMEEN S/12™ surfactant (a fatty amine ethoxylate surfactant available from Akzo Nobel Chemicals, Chicago, Ill.), and REWOTERIC AM TEG™ surfactant (a tallow dihydroxyethyl betaine amphoteric surfactant available from Degussa Corp., Parsippany, N.J.).

In certain embodiments, surfactants capable of forming a gel having a viscosity of at least 20 cP in the viscosified remedial fluids of the present invention may comprise one or more of the surfactant gelling agents disclosed above as viscoelastic surfactants.

In certain embodiments, a surfactant gelling agent suitable for use in the viscosified remedial fluids of the present invention may be combined with a gas component in a viscosified remedial fluid to yield a foamed viscosified remedial fluid. As used herein, the term "foamed viscosified remedial fluid" is defined to include a viscosified remedial fluid that comprises both a viscosifying agent and a gas component, wherein the viscosifying agent is not itself a gas component. As used herein, "foaming" and "foamed" also encompass "commingling" and "commingled" fluids. This fluid may have a gas component ranging in the amount of 5 to 95% gas. The gas typically may comprise nitrogen, carbon dioxide, air, mixtures thereof, and the like. In certain embodiments, a foamed remedial fluid of the present invention may have at least 60 quality foam.

In embodiments where the surfactant gelling agent is combined with a gas component, examples of suitable surfactant gelling agents include, but are not limited to, betaine surfactants, alpha-olefinic sulfonate surfactants, amine oxide surfactants, and combinations thereof.

Examples of betaine surfactants suitable for combination with a gas component include, but are not limited to, those having a structure according to Formula 1:

wherein R is a radical selected from the group of decyl, cetyl, oleyl, laureyl, cocoyl, and mixtures thereof. Betaine surfactants containing mixtures of R groups, including but not limited to tallow, may be suitable for use in the present invention.

Examples of alpha-olefinic sulfonate surfactants suitable for combination with a gas component include, but are not limited to, those having a structure according to Formula 2:

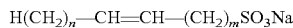

wherein n and m are independently selectable integers in the range of from about 6 to 16.

In certain embodiments, the surfactant gelling agents in the viscosified remedial fluids of the present invention that may be combined with a gas component may comprise amine oxide surfactants. Examples amine oxide surfactants suitable for combination with a gas component include, but are not limited to, those having a structure according to Formula 3:

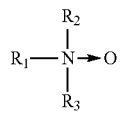

wherein $R_1$ represents a hydrophobic moiety of alkyl, alkylarylalkyl, alkoxyalkyl, alkylaminoalkyl and alkylamidoalkyl, wherein alkyl represents a group that contains from about 8 to about 27 carbon atoms which may be branched or straight chained and which may be saturated or unsaturated. Representative long chain alkyl groups include tetradecyl (myristyl), hexadecyl (cetyl), octadecentyl (oleyl), octadecyl (stearyl), docosenoic (erucyl) and the derivatives of tallow, coco, soya and rapeseed oils. The preferred alkyl and alkenyl groups are alkyl and alkenyl groups having from about 16 to about 22 carbon atoms. Representative of alkylamidoalkyl is alkylamidopropyl with alkyl being as described above.

$R_2$ and $R_3$ are independently an aliphatic chain (that is nonaromatic at the atom bonded to the quaternary nitrogen, for example, alkyl, alkenyl, arylalkyl, hydroxyalkyl, carboxyalkyl, and hydroxyalkyl-polyoxyalkylene, for example hydroxyethyl-polyoxyethylene or hydroxypropyl-polyoxypropylene) having from 1 to about 30 carbon atoms, preferably from about 1 to about 20 carbon atoms, more preferably from about 1 to about 10 carbon atoms and most preferably from about 1 to about 6 carbon atoms in which the aliphatic group can be branched or straight chained, saturated or unsaturated. Preferred alkyl chains are methyl, ethyl, preferred arylalkyl is benzyl, and preferred hydroxyalkyls are hydroxyethyl or hydroxypropyl, while preferred carboxyalkyls are acetate and propionate.

Other examples of suitable amine oxide surfactants having a structure according to Formula 3 may include those wherein $R_1$ is an alkyl or alkylamido group averaging from about 8 to 27 carbon atoms and $R_2$ and $R_3$ are independently H, or an alkyl group averaging from about 1 to about 6 carbon atoms. Preferably, $R_1$ is an alkyl or alkylamido group averaging from about 8 to about 16 carbon atoms and $R_2$ and $R_3$ are independently alkyl groups averaging from about 2 to about 3 carbon atoms. A particularly preferred amine oxide surfactant is tallow amido propylamine oxide (TAPAO), which should be understood as a dipropylamine oxide since both $R_1$ and $R_2$ groups are propyl.

Another example of suitable amine oxide surfactants are amidoamine oxide surfactants including, but not limited to, those having a structure according to Formula 4:

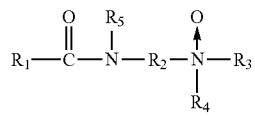

wherein $R_1$ is a saturated or unsaturated, straight or branched chain aliphatic group of from about 7 to about 30 carbon atoms, preferably from about 14 to about 21 carbon atoms. More preferably, $R_1$ is a fatty aliphatic derived from natural fats or oils having an iodine value of from about 1 to about 140, preferably from about 30 to about 90, and more preferably from 40 to about 70. $R_1$ may be restricted to a single chain length or may be of mixed chain length such as those groups derived from natural fats and oils or petroleum stocks. Preferred are tallow alkyl, hardened tallow alkyl, rapeseed alkyl, hardened rapeseed alkyl, tall oil alkyl, hardened tall oil alkyl, coco alkyl, oleyl, or soya alkyl. $R_2$ is a straight chain or branched, substituted or unsubstituted divalent alkylene group of from 2 to about 6 carbon atoms, preferably, of 2 to 4 carbon atoms and more preferably of 3 carbon atoms. $R_3$ and $R_4$ are the same or different and are independently selected from alkyl or hydroxyalkyl groups of from 1 to about 4 carbon atoms and are preferably hydroxyethyl or methyl. Alternatively, $R_3$ and $R_4$ in the amidoamine oxide of Formula 4, together with the nitrogen atom to which these groups are bonded, form a heterocyclic ring of up to 6 members. Finally, $R_5$ is hydrogen or a $C_1$-$C_4$ alkyl or hydroxyalkyl group. Examples of amidoamine oxide surfactants suitable for use in the present invention may include, but are not limited to, tallow amidoalkylamine oxide, hardened tallow amidoalkylamine oxide, rapeseed amidoalkylamine oxide, hardened rapeseed amidoalkylamine oxide, tall oil amidoalkylamine oxide, hardened tall oil amidoalkylamine oxide, coco amidoalkylamine oxide, stearyl amidoalkylamine oxide, oleyl amidoalkylamine oxide, soya amidoalkylamine oxide, tallow amidopropyl dimethylamine oxide, hydrogenated tallow amidopropyl dimethylamine oxide, soya amidopropyl dimethylamine oxide, oleyl amidopropyl dimethylamine oxide, erucyl amidopropyl dimethylamine oxide, rapeseed amidopropyl dimethylamine oxide, hydrogenated rapeseed amidopropyl dimethylamine oxide, tall oil amidopropyl dimethylamine oxide, hydrogenated tall oil amidopropyl dimethylamine oxide, $C_{14}$-$C_{22}$ saturated or unsaturated fatty acid amidopropyl dimethylamine oxides, combinations thereof, and derivatives thereof. An example of a commercially available amidoamine oxide surfactant suitable for use in the viscosified remedial fluids of the present invention is available under the trade name AROMOX® APA-T surfactant by Akzo-Nobel.

Furthermore, amine oxide surfactants such as those disclosed in U.S. Publication No. 2005/026778, U.S. Publication No. 2005/0137095, U.S. Pat. No. 6,831,108, and U.S. Pat. No. 7,060,661, the relevant disclosures of which are incorporated herein by reference, may also be suitable.

In those embodiments where the viscosifying agent comprises a surfactant gelling agent, the surfactant gelling agent may be present in an amount sufficient to impart the desired viscosity to a viscosified remedial fluid. In certain embodiments, the surfactant gelling agent may be present in a viscosified remedial fluid in an amount in the range of from about 0.1% to about 10% by weight of the fluid. In certain embodiments, the surfactant gelling agent may be present in the a viscosified remedial fluid in an amount in the range of from about 0.5% to about 6% by weight of the fluid. In certain embodiments, the surfactant gelling agent may be present in a viscosified remedial fluid in an amount in the range of from about 1.5% to about 5% by weight of the fluid. In certain embodiments, wherein the surfactant gelling agents in the viscosified remedial fluids of the present invention are combined with a gas component to yield a foamed viscosified remedial fluid, the surfactant gelling agent may be present in the foamed viscosified remedial fluid in an amount in the range of from about 1% to 2%. In certain embodiments having at least 60 quality foam, the surfactant gelling agent may be present in the viscosified remedial fluid in an amount in the range of from about 1% to 2%.

In some embodiments, a gelling agent suitable for use as a viscosifying agent in the viscosified remedial fluids of the present invention may comprise a polymer gelling agent. Examples of suitable polymer gelling agents include those polymer gelling agents that may comprise a polymer that is degradable when contacted by the oxidizers of the viscosified remedial fluids of the present invention. In certain embodiments of this type the polymer gelling agent may, when added to a viscosified remedial fluid of the present invention, act to viscosify or gel a remedial fluid thereby creating a carrier gel for the oxidizer. The use of a carrier gel may allow for deep placement of the oxidizer with good coverage of gel damage present in the subterranean formation. Generally, a polymer gelling agent suitable for use in the viscosified remedial fluids of the present invention may remain stable when exposed to an oxidizer in the viscosified remedial fluids of the present invention over a time period ranging from on the order of minutes to on the order of hours or days. This period of stability of the polymer gelling agent may allow for good placement of a viscosified remedial fluid and good coverage of a subterranean formation to treat gel damage prior to degradation of the carrier gel. In certain embodiments, a polymer gelling agent may be used in combination with a surfactant gelling agent.

In certain embodiments, a suitable polymer gelling agent should be selected so as to provide a desired viscosity to the viscosified remedial fluids of the present invention for a desired amount of time when introduced into a subterranean formation in the presence of the chosen oxidizer or oxidizers. Furthermore, suitable polymer gelling agents for use in the viscosified remedial fluids of the present invention may impart minimal damage to a subterranean formation. Examples of suitable polymer gelling agents include, but are not limited to, xanthan, diutans, wellans, hydroxyethyl cellulose, succinoglycan, clarified biopolymers, scleroglycan, bioengineered polymers, combinations thereof, and derivatives thereof. Examples of commercially-available polymer gelling agents suitable for use in the present invention may include, but are not limited to, WG37™ agent, FDP-S803-05™ agent, FLO-PAC™ polymer gelling agent, FDP-S848-06™ agent, and FDP-S849-06™ agent (all of which are available from Halliburton Energy Services, Duncan, Okla.). Preferably, the polymer gelling agent chosen will have little or no residue when broken, and/or it will have high regain permeability values when broken. Suitable polymer gelling agents of this type may comprise a synthetic polymer. In certain embodiments, a polymer gelling agent may be present in a viscosified remedial fluid in an amount in the range of from about 5 lb/Mgal to about 200 lb/Mgal. In certain embodiments, a polymer gelling agent may be present in a viscosified remedial fluid in an amount in the range of from about 10 lb/Mgal to about 150 lb/Mgal. In certain embodiments, the polymer gelling agent may be present in the remedial fluid in an amount in the range of from about 20 lb/Mgal to about 100 lb/Mgal. In certain embodiments, the polymer gelling agent may be present in the remedial fluid in an amount of about 60 lb/Mgal. For embodiments comprising a gas component, the foregoing ranges are applicable to the liquid component of the viscosified remedial fluid.

In certain embodiments, it may be desirable to use a viscosified remedial fluid that contains neither a surfactant gelling agent nor a polymer gelling agent. Embodiments of this type may be said to be viscosified by physical rather than chemical means. In certain embodiments of this type, the viscosifying agent may be an emulsifier, such that the viscosified remedial fluid is an emulsion comprising an oxidizer. Emulsifiers suitable for use in the viscosified remedial fluids of the present invention may include, but are not limited to, a nonionic surfactant such as a sorbitan ester. Examples of suitable commercially available emulsifiers may include SEM-7™ emulsifier, AF-61™ emulsifier, and AF-70™ emulsifier, each available from Halliburton Energy Services, Duncan, Okla. If an emulsifier is used, generally an amount from about 0.1% to about 3% based on volume is sufficient.

In certain embodiments wherein the viscosity of a viscosified remedial fluid is provided by physical means, the viscosifying agent may be a gas component incorporated in the base fluid to yield a foamed remedial fluid comprising an oxidizer. Such embodiments may optionally comprise a foaming agent. Examples of gases that may be suitable for inclusion in a foamed remedial fluid of the present invention include nitrogen, carbon dioxide, and mixtures thereof, although any gas may be utilized for foaming the foamed remedial fluids of this invention. In examples of such embodiments, the gas may be present in a foamed remedial fluid in an amount in the range of from about 5% to about 95% by volume of the remedial fluid, and more preferably in the range of from about 20% to about 80%. The amount of gas to incorporate into the fluid may be affected by factors including the viscosity of the fluid and/or wellhead pressures involved in a particular application. Examples of foaming agents that may be utilized to foam and stabilize the foamed remedial fluids of this invention include, but are not limited to, betaines, alkylamidobetaines such as cocoamidopropyl betaine, alpha-olefin sulfonate, trimethyltallowammonium chloride, $C_8$ to $C_{22}$ alkylethoxylate sulfate, trimethylcocoammonium chloride, amine oxides, methyl ester sulfonates, combinations thereof, and derivatives thereof. Examples of suitable commercially available foaming agents may include HY-CLEAN(HC-2)™ surface-active suspending agent or AQF-2™ additive, both commercially available from Halliburton Energy Services, Inc., of Duncan, Okla. Other suitable foaming agents and foam stabilizing agents may be included as well, which will be known to those skilled in the art with the benefit of this disclosure. The foaming agent may generally be present in a foamed remedial fluid of the present invention in an amount in the range of from about 0.1% to about 2.0% by weight, more preferably in the amount of from about 0.2% to about 1.0% and most preferably about 0.6%. Optionally, foaming agents may be used in combination with viscosified remedial fluids that comprise a gelling agent and/or an emulsifier. Other suitable surfactants that may act as foamers in a particular application may include 19N™ surfactant, G-SPERSE™ dispersant, HOWCO-SUDS™ foaming agent, A-SPERSE™ dispersing aid for acid additives, MORFLO III® surfactant, and HYFLO® IV M surfactant, each available from Halliburton Energy Services, Duncan, Okla. Other suitable foaming agents and foam stabilizing agents may be included as well, which will be known to those skilled in the art with the benefit of this disclosure.

In certain embodiments, microemulsion additives may optionally be included in the viscosified remedial fluids of the present invention. Where included, the microemulsion additive may be used alone or in combination with one or more of a gelling agent, an emulsifier, or a gas to add viscosity to a viscosified remedial fluid of the present invention. Suitable microemulsion additives may include, but are not limited to, PEN-88M™ surfactant, PEN-88HT™ surfactant, SSO-21E™ surfactant, SSO-21MW™ surfactant, GASPERM 1000™ microemulsion surfactant/solvent additive, each available from Halliburton Energy Services, Duncan, Okla. Other suitable microemulsion additives may include MA-845™ additive and MA844™ additive, commercially available from CESI Chemical of Duncan, Okla.; SHALE-SURF1000™ additive, commercially available from Frac Tech Services of Aledo, Tex.; and those disclosed in U.S. Publication No. 2003/0166472A1 the relevant disclosure of which is incorporated by reference.

To the extent that the surfactants disclosed herein may have utility as surfactant gelling agents, foaming agents, or combinations thereof in a given embodiment, a person of ordinary skill in the art will recognize that a surfactant may be able to serve multiple functions (for example, gelling agent, foaming agent, nonemulsifier, emulsifier, or combinations thereof, etc.) that may depend upon fluid composition, temperature, and desired application.

The oxidizers of the viscosified remedial fluids of the present invention generally may be any oxidizer suitable for use in subterranean remedial operations. It is within the knowledge of a person of ordinary skill in the art to select one or more oxidizers based on the requirements of a particular application. In certain embodiments, for example, oxidizers that generate insoluble salts (for example, persulfate salts) may be undesirable. In certain embodiments, for example, an oxidizer that responds to temperature (for example, potassium permanganate and sodium perborate) may be alternatively desirable or undesirable.

In certain embodiments, for example, it may be desirable to select an oxidizer that reacts slowly with gel damage in the subterranean formation to allow for deep placement of the oxidizer. For example, a suitable oxidizer may be encapsulated if desired. Suitable encapsulation methods are known to those skilled in the art. One suitable encapsulation method that may be used involves coating the chosen oxidizers with a material that will degrade when downhole so as to release the oxidizer when desired. Resins that may be suitable include, but are not limited to, polymeric materials that will degrade when downhole. The terms "degrade," "degradation," or "degradable" refer to both the two relatively extreme cases of degradation that the degradable material may undergo, that is, heterogeneous (or bulk erosion) and homogeneous (or surface erosion), and any stage of degradation in between these two. This degradation can be a result of, among other things, a chemical or thermal reaction or a reaction induced by radiation. Suitable examples of degradable materials include, but are not limited to, polysaccharides such as dextran or cellulose; chitins; chitosans; proteins; aliphatic polyesters; poly (lactides); poly(glycolides); poly(ϵ-caprolactones); poly(hydroxybutyrates); poly(anhydrides); aliphatic polycarbonates; ortho ethers, poly(ortho ethers); poly(amino acids); poly(ethylene oxides); polyphosphazenes; combinations thereof; and derivatives thereof.

Examples of oxidizers suitable for use in the present invention include, but are not limited to, peroxide generating compounds, peroxides, hydrogen peroxide, t-butyl peroxide, organic peroxides, salts of perborates, salts of permanganates, salts of percarbonates, salts of hypochlorites, salts of chlorites, sodium hypochlorite, lithium hypochlorite, chlorate salts, sodium perborate, sodium persulfate, potassium persulfate, ammonium persulfate, sodium permanganate, potassium permanganate, magnesium permanganate, calcium permanganate, sodium percarbonate, potassium percarbonate, hydrazine, sodium periodate, potassium periodate, sodium bromate, calcium peroxide, and magnesium peroxide. Derivative and combinations of these may also be suitable. Examples of commercially-available oxidizing agents include OPTIKLEEN$^{SM}$ fracture cleaning service, VICON NF™ breaker, SP™ breaker agent, AP™ breaker, HT™ breaker, OPTIFLO-II™ delayed release breaker, OPTIFLO III™ delayed release breaker, hypochlorite salts (such as bleach), OXOL$^{SM}$ cleaning service, OXOL$^{SM}$ II cleaning service, VICON HT™ breaker, VICON FB™ breaker, and GBW-40 breaker (all of which are available from Halliburton Energy Services, Inc, Duncan, Okla.). A person of ordinary skill in the art, with the benefit of this disclosure, will recognize the suitability of numerous other salts and derivatives of the above-mentioned oxidizers. Such suitable salts and derivatives are in the spirit of this invention.

The oxidizers of the present invention may be present in the remedial fluid in an amount in the range of from about from 0.001 to about 99.9% by weight of the fluid. The oxidizers should be present in a remedial fluid of the present invention in an amount sufficient to provide a desired level of remediation to any damage that may be present. In certain embodiments, wherein the action of the oxidizer on a gelling agent present in the viscosified remedial fluid may be required to break the viscosity of the viscosified remedial fluid, the amount of oxidizer present in a viscosified remedial fluid of the present invention should be adjusted accordingly. In certain embodiments, an excess of oxidizer may be included relative to the amount of damage and/or gelling agent to be broken. In certain embodiments, the oxidizer may be present in the remedial fluid in an amount in the range of from about 0.001% to about 70% by weight of the fluid. In certain embodiments, the oxidizer may be present in the remedial fluid in an amount in the range of from about 0.01% to about 30% by weight of the fluid. In certain embodiments, the oxidizer may be present in the remedial fluid in an amount in the range of from about 0.01% to about 10% by weight of the fluid. In certain embodiments, the oxidizer may be present in the remedial fluid in an amount in the range of from about 0.05% to about 6% by weight of the fluid. In certain embodiments, the surfactant gelling agent may be present in the remedial fluid in an amount in the range of from about 1.5% to about 5% by weight of the fluid. In certain embodiments, the oxidizer may be present in the remedial fluid in an amount in the range of from about 0.05% to about 2% by weight of fluid. In certain embodiments, the oxidizer may be present in the remedial fluid in an amount in the range of from about 1% to about 2% by weight of fluid. The amount and type of oxidizer suitable in a particular application of the present invention may depend upon a variety of factors, such as the type of gelling agent present in the remedial fluid, the temperature of the fluid, the extent and type of gel damage present in a subterranean formation, safety considerations and the like. A person of ordinary skill, with the benefit of this disclosure, will recognize the appropriate amount of oxidizer to include in a particular application of the present invention.

The viscosified remedial fluids of the present invention may comprise an inorganic salt. Examples of suitable salts include calcium bromide, zinc bromide, calcium chloride, sodium chloride, sodium bromide, potassium bromide, potassium chloride, sodium nitrate, sodium formate, potassium formate, cesium formate, magnesium chloride, seawater, formation brine, mixtures thereof, and the like. A person of ordinary skill in the art will recognize that the amount and type of salt may be determined by factors such as the parameters of an application (e.g. fluid properties, formation compatibility, density, and the like) and/or the gelling agent selected. In certain embodiments, the viscosified remedial fluids of the present invention may comprise an inorganic salt in any amount up to and including saturation.

The viscosified remedial fluids of the present invention optionally may comprise one or more additional additives known in the art, including, but not limited to, degradable fluid loss control additives, gel stabilizers, secondary breakers (e.g., enzymes), gas (e.g., carbon dioxide or nitrogen), salts (e.g., KCl), pH-adjusting agents (e.g., buffers), corrosion inhibitors, dispersants, flocculants, acids, foaming agents, antifoaming agents, $H_2S$ scavengers, lubricants, oxygen scavengers, weighting agents, scale inhibitors, surfactants, catalysts, clay control agents, biocides, friction reducers, particulates (e.g., proppant particulates, gravel particulates), nonemulsifiers, solvents, mutual solvents, paraffin inhibitors, asphaltene inhibitors, hydrate inhibitors, derivatives thereof, and combinations thereof. In certain embodiments, for example, that utilize bleach as the oxidizer, it may be desirable to conduct remedial operations at elevated pH to reduce corrosion effects. An example viscosified remedial fluid of this type may include 1-10% bleach, 100-200 lb/Mgal caustic soda, and a gelling agent. For example, a secondary breaker comprising an enzyme may be included in certain viscosified remedial fluids of the present invention, particularly when gel damage in the formation includes natural polymers such as cellulose at low temperature. Examples of suitable commercially available enzyme breakers include GBW-30™ breaker and HPH™ high-pH breaker (both available from Halliburton Energy Services, Duncan, Okla.) Individuals skilled in the art, with the benefit of this disclosure, will recognize the types of additives that may be suitable for a particular application of the present invention. For example, an acid may be included in certain viscosified remedial fluids of the present invention, among other things, to reverse or break crosslinks in gel damage present in a subterranean formation.

The viscosified remedial fluids of the present invention optionally may include and/or be used in conjunction with ortho ethers. In embodiments of this type, the ortho ethers may, among other things, act to break, or aid in the breaking, of the viscosified remedial fluids of the present invention and/or aid in the remediation of damage in a subterranean formation. Ortho ethers may, in the presence of water, hydrolyze over time to form an acid and an alcohol. In certain embodiments, the hydrolysis products of the ortho ethers may interact with a gelling agent to break, or aid in the breaking, of the viscosified remedial fluids of the present invention. In certain embodiments, the hydrolysis products of the ortho ethers may interact with gel damage in a formation, among other things, to decrease its viscosity. The inclusion of ortho ethers may be desirable, among other circumstances, when the gelling agent of the viscosified remedial fluid is a surfactant gelling agent, especially a viscoelastic surfactant gelling agent. In certain embodiments, the ortho ethers may also activate breakers, activate oxidizers, and/or reduce surface tension. For embodiments wherein the ortho ethers act to reduce surface tension, the lower surface tension may provide easier flow-back.

Examples of suitable ortho ethers for use with the viscosified remedial fluids of the present invention have a structure described by the formula: $RC(OR')(OR'')(OR''')$, wherein $R'$, $R''$, and $R'''$ are not hydrogen, and $R'$, $R''$, and $R'''$ may or may not be the same group. $R'$, $R''$, or $R'''$ may comprise a heteroatom that may affect the solubility of the chosen ortho ether in a given application. Suitable heteroatoms could include nitrogen or oxygen. Suitable poly(ortho ethers) also are described in an article entitled, Poly(ortho ethers)—From Concept to Reality, BIOMACROMOLECULES, Vol. 5, 1625 (2004), and references cited therein. Examples of suitable ortho ethers and poly(ortho ethers) include, but are not limited to, orthoacetates, such as trimethyl orthoacetate, triethyl orthoacetate, tripropyl orthoacetate, triisopropyl orthoacetate, tributyl orthoacetates, and poly(orthoacetates); orthoformates, such as trimethyl orthoformate, triethyl orthoformate, tripropyl orthoformate, triisopropyl orthoformate, tributyl orthoformate, and poly(orthoformates); orthopropionates, such as trimethyl orthopropionate, triethyl orthopropionate, tripropyl orthopropionate, triisopropyl orthopropionate, tributyl orthopropionate, and poly(orthopropionates); combinations thereof; and derivatives thereof. Suitable ortho ethers also may be ortho ethers of polyfunctional alcohols, such as glycerin and/or ethylene glycol. Those skilled in the art with the benefit of this disclosure will recognize suitable ortho ethers and/or poly(ortho ethers) that may be used in a desired application. In choosing an ortho ether, one should be mindful that some ortho ethers have low flash points. Various derivatives of those ortho ethers can be synthesized by transesterification with variety of alcohols, sugars, or polyols.

Depending on the desired application, the ortho ethers or the poly(ortho ethers) may be water soluble, water insoluble, or solid. Generally speaking, water soluble ortho ethers are easy to hydrolyze at lower temperature in comparison to water insoluble ortho ethers. By making an ortho ether or a poly(ortho ether) more hydrophobic, the ortho ether may be more suitable for use in higher temperature applications. Also, poly(ortho ethers) made by glycerol and trimethyl orthoformate are water soluble depending on the number of repeating units and can be used for lower temperature applications. One of the advantages of having a poly(ortho ether) over an ortho ether is that it has a higher flash point and a higher viscosity. The choice of which particular ortho ether to use should be guided by such considerations as environmental factors, and the desired delay time before a sufficient amount of hydrolysis products are generated to break, or help break, the viscosified remedial fluid. One should also note that ortho ethers and poly(ortho ethers) can be selected to yield either formic or acetic acid on hydrolysis.

The amount of an ortho ether needed to break a viscosified remedial fluid of the present invention will depend on, inter alia, the composition of the viscosified remedial fluid, the temperature of the formation, the concentration of the viscosifying agent, and other considerations recognized by one skilled in the art with the benefit of this disclosure. Generally speaking, the amount of the breaker to include is an amount sufficient to neutralize any inhibitor that may be present and contribute to breaking the viscosified remedial fluid and/or contribute to the remediation of gel damage in a subterranean formation. This amount will be determinable by one of ordinary skill in the art with the benefit of this disclosure. In some embodiments, this may be from about 0.1% to about 10% based on the volume of viscosified remedial fluid, excluding the gaseous phase of foam volume that may be present.

The ortho ethers and/or poly(ortho ethers) suitable for use in the viscosified remedial fluids of the present invention may be in any suitable form. For instance, these compositions can be used in a solution form, a gel form, a solid form, or an emulsion form. In certain applications, a solution form may be useful, e.g., when a faster break is desired; in other applications, e.g., when a slower break is desirable, a gel or emulsion form may be most suitable. For the solution form, suitable exemplary solvents include propylene glycol, propylene glycol monomethyl ether, dipropylene glycol monomethyl ether, and ethylene glycol monobutyl ether. In some embodiments, mixtures of solvents and water may be beneficial, for example, to keep the ortho ether solubilized. The gel form of the ortho ether composition may be gelled with suitable polymers and/or surfactants. For the emulsion form, suitable emulsifiers include emulsifiers like WS-44™ emulsifying agent, which is commercially available from Halliburton Energy Services, Duncan, Okla.

To allow the ortho ether to hydrolyze to produce an acid and an alcohol, a source of water is needed. The water should be present in an amount from about 2 moles of water for about every 1 mole of ortho ether or poly(ortho ether) to an excess of water, which may help ensure the solubility of the reaction product of the reaction between the generated hydrolysis products and the components in the viscosified remedial fluid. One of ordinary skill in the art with the benefit of this disclosure will recognize whether a suitable amount of water is present in either the viscosified remedial fluid, a present well fluid, or otherwise in the well bore for a desired application.

The ortho ether breakers suitable for use with the viscosified remedial fluids of the present invention are generally stable at a pH of about 8 or above. To maintain a desired delay, preferably the pH should be maintained at 8 or above. To maintain this pH, the ortho ether breakers or the viscosified remedial fluid may comprise an inhibitor. The inhibitor may further delay the generation of the acid from the breaker, and also may neutralize the generated acid during the delay period. Suitable inhibitors include bases. Examples of some preferred inhibitors may include sodium hydroxide, potassium hydroxide, magnesium oxide, magnesium hydroxide, calcium oxide, calcium hydroxide, amines (such as hexamethylenetetramine), sodium carbonate, potassium carbonate, derivatives of these, and combinations of these. In certain embodiments, a small amount of a strong base as opposed to a large amount of a relatively weak base is preferred to achieve the delayed generation of the acid and the neutralization of the generated acid for a desired delay period.

Depending on the pH of the viscosified remedial fluid (i.e., the pH of the viscosified remedial fluid before raising the pH and/or before adding the breaker), the breaker may need to be incorporated in a certain manner depending on the stability of the breaker to the pH of the viscosified remedial fluid. This is because the degradation of ortho ethers and poly(ortho ethers) is thought to be acid-catalyzed. If the viscosified remedial fluid has a high pH, (e.g., a pH of 8 or greater), then the ortho ether breaker can be added directly to the viscosified remedial fluid with little risk of negatively impacting the breaker, followed by the inhibitor if desired. Optionally, an emulsifying surfactant may be added to keep the ortho ether breaker intimately mixed with the viscosified remedial fluid Adding the ortho ether breaker by way of an emulsion may be useful, for example, to help remediate gel damage in a formation. Since ortho ethers and poly(ortho ethers) are relatively sensitive to acidic pH, if the viscosified remedial fluid is acidic, to effectively incorporate the breaker into the viscosified remedial fluid, a procedure may be used to protect the breaker from the viscosified remedial fluid. In one embodiment, this may be accomplished by making an emulsion of the breaker in water, and adding it to the gel simultaneously with an inhibitor to prevent the pH from decreasing. In another embodiment, the emulsion may be formed with a breaker, and a crosslinking agent in an aqueous fluid. An inhibitor may be added if desired. In another embodiment, a poly(ortho ether) may be synthesized such that it is sufficiently hydrophobic so that it can withstand the low pH without hydrolyzing while it is being incorporated into the viscosified remedial fluid, e.g., as a solid or liquid.

Optionally, the ortho ether breakers may comprise: esters; aliphatic polyesters; ortho ethers; poly (ortho ethers); poly (lactides); poly(glycolides); poly($\epsilon$-caprolactones); poly(hydroxybutyrates); poly(anhydrides); aliphatic polycarbonates; poly(amino acids); poly(ethylene oxide); and polyphosphazenes, or copolymers thereof. Derivatives and combinations also may be suitable. The ortho ether breakers also may include formate esters including, but not limited to, ethylene glycol monoformate, ethylene glycol diformate, diethylene glycol diformate, glyceryl monoformate, glyceryl diformate, glyceryl triformate, triethylene glycol diformate and formate esters of pentaerythritol. Of these, ethylene glycol monoformate and diethylene glycol diformate may be preferred. Other suitable materials may be disclosed in U.S. Pat. Nos. 6,877,563 and 7,021,383, the disclosures of which are incorporated by reference.

When used, the concentration of the ortho ether breaker may range from about 0.1% to about 10% based on the total volume of the fluids present. The particular concentration used in any particular embodiment depends on what ortho ether breaker is being used, and what percentage of acid/alcohol is generated. Other complex, interrelated factors that may be considered in deciding how much of the breaker to use include, but are not limited to, the composition of the formation, the temperature of the formation, the pressure of the formation, the particular fines, gel damage, and nongel damage present in the formation (for example, scale, calcium carbonate, silicates, bacterial slime, and the like), the particular breaker used, etc. To avoid undesirable salt precipitation problems, it may be desirable to combine formates and acetates or lactates to keep both below the saturation concentration that would cause salts to precipitate in formation, but still achieve the acid potential necessary for the job.

The ortho ether breakers may be added to the viscosified remedial fluid at any point in time desired. In some instances, it may be desirable to pump the ortho ether breaker downhole with the viscosified remedial fluid, and in other instances, it may be desirable to pump the ortho ether breaker at a later point in time. In some embodiments, the ortho ether breakers may be introduced into a subterranean formation before a viscosified remedial fluid, for instance in a pre-pad or a pad fluid. In other embodiments, the ortho ether breaker may be combined with the viscosified remedial fluid before being placed into a subterranean formation so that they effectively are placed together.

The viscosified remedial fluids of the present invention and/or any component thereof may be prepared at a job site, or they may be prepared at a plant or facility prior to use, and may be stored for some period of time prior to use. In certain embodiments, the preparation of the viscosified remedial fluids of the present invention may be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going operation. Such mixing can also be described as "real-time" mixing.

The methods and viscosified remedial fluids of the present invention, among other things, may be useful to remediate filter cake damage, friction reducer damage, and/or polymer residue damage, including damage from synthetic and/or natural polymers, such as may be present in a subterranean formation. Such damage may be introduced into a subterranean formation through a variety of operations, including, but not limited to, drilling, fracturing, gel pills, gelled acidizing treatments, and/or gravel packing operations. The methods and viscosified remedial fluids of the present invention, among other things, may also be useful to remediate other damage present in a subterranean formation, including but not limited to, damage caused by one or more of asphaltenes, paraffins, bacterial slime, scale, pipe dope, grease, heavy oil, combinations thereof, and derivatives thereof. Such damage may be introduced into a subterranean formation through any treatment operation, caused by a natural occurrence in a subterranean formation, or a mixture thereof.

In certain embodiments, the present invention provides methods comprising introducing a viscosified remedial fluid comprising a base fluid, a viscosifying agent, and an oxidizer into at least a portion of a subterranean formation having damage present therein so as to contact the damage with the viscosified remedial fluid; and allowing the viscosified remedial fluid to at least partially remediate the damage present in the subterranean formation. In certain embodiments, the oxidizer may be employed to reduce the viscosity of viscosified remedial fluid at a desired time, such as, for example, after the oxidizer has been allowed to at least partially remediate the damage present in the subterranean formation. When utilized for this purpose, the oxidizer may initially be present in the viscosified remedial fluid in an amount in excess of that required to reduce the viscosity of the viscosified remedial fluid by a desired amount. Alternatively, the oxidizer may be present in an amount in excess of that deemed necessary both to at least partially remediate damage in the subterranean formation and to at least partially reduce the viscosity of the viscosified remedial fluid. Further, the oxidizer and/or the viscosifying agent may be selected so that the oxidizer acts to at least partially remediate damage present in the formation on a time scale shorter than that required for the oxidizer to at least partially reduce the viscosity of the viscosified remedial fluid.

In certain embodiments, the present invention provides methods that utilize a first remedial fluid of the present invention to divert at least a portion of a second remedial fluid to a different portion of the subterranean formation. In one embodiment, the methods of the present invention comprise: providing a first remedial fluid that comprises an aqueous base fluid and a gelling agent; introducing the first remedial fluid into a portion of a subterranean formation; and allowing the first remedial fluid to divert at least a portion of a second remedial fluid that comprises an oxidizer to a different portion of the subterranean formation. In certain embodiments the first remedial fluid may further comprise an oxidizer. In certain embodiments, second remedial fluid may be of the same composition or a different composition than the first remedial fluid. For example, in some instances, the first remedial fluid may be self-diverting. One of ordinary skill in the art, with the benefit of this disclosure, will recognize the optimal viscosity for the remedial fluids in a specific application.

In certain embodiments, a first remedial fluid may plug off a high-permeability section of the subterranean formation, thereby diverting subsequently introduced fluids to less permeable sections of the formation. In other embodiments, a first remedial fluid may divert the subsequently introduced fluids so as to obtain a uniform distribution of those fluids throughout the subterranean formation regardless of the permeability of the particular portion thereof. In certain embodiments, the damage in the subterranean formation that is to be remediated may be present in the high-permeability section of the subterranean formation, any of a number of less permeable sections of the subterranean formation, or both. Those of ordinary skill in the art, with the benefit of this disclosure, should be able to determine other suitable diverting applications for the remedial fluids of the present invention.

So that a first remedial fluid may divert the flow of a subsequent remedial fluids, the first remedial fluid should be formulated such that it has, or will develop, a viscosity sufficient to divert flow. The viscosity of the first remedial fluid necessary to divert flow may depend on, among other factors, the depth of the plug created, the size of the pores or wormholes, the composition of the second fluid to be diverted, the temperature of the subterranean formation, and differential pressure.

In some embodiments, the first remedial fluid may be a gel sufficient to divert flow prior to introduction into the subterranean formation. In some embodiments, the gel may form during or subsequent to the introduction of the first remedial fluid into the portion of the subterranean formation. For example, a first remedial fluid comprising a surfactant gelling agent may contact formation fluids (e.g., formation brines) that provide the conditions sufficient for micelle formation, thereby forming a viscosified remedial fluid for diverting subsequent remedial fluids. In some embodiments, the first remedial fluid may be a foamed gel sufficient to divert flow or an emulsion sufficient to divert flow.

In certain embodiments, the present invention provides methods comprising introducing a viscosified remedial fluid comprising a base fluid, a first viscosifying agent, and an oxidizer into at least a portion of a subterranean formation before a treatment fluid comprising a second viscosifying agent is introduced therein, wherein the oxidizer is available to remediate damage in the subterranean formation. In certain embodiments of this type, the viscosified remedial fluid may be introduced into the subterranean formation before a treatment fluid (for example, a fracturing fluid) is placed therein. Thus, the oxidizer may contact damage caused by the treatment fluid as the damage is being formed, during flowback of the viscosified remedial fluid, or both. When the viscosified remedial fluid is introduced into the subterranean formation before a treatment fluid expected to cause damage therein, the first viscosifying agent present in the viscosified remedial fluid should not interact with the oxidizer so as to consume the oxidizer (or otherwise make the oxidizer unavailable to remediate damage) before the treatment fluid comprising the second viscosifying agent is introduced into the subterranean formation. In certain embodiments, the availability of the oxidizer may be preserved by using a first viscosifying agent that is different from the second viscosifying agent, such that the oxidizer does not interact with the first viscosifying agent so as to become unavailable before it contacts damage that may be caused by the second viscosifying agent.

In certain embodiments, the availability of the oxidizer to remediate damage may be preserved by utilizing a viscosified remedial fluid comprising a base fluid, a first viscosifying agent, and an oxidizer, wherein the oxidizer does not substantially interact with the first viscosifying agent. Optionally, such a viscosified remedial fluid may include one or more breakers selected to reduce the viscosity of the viscosified remedial fluid at a selected time.

As previously mentioned, the viscosified remedial fluids of the present invention may experience a reduction in viscosity after placement into the subterranean formation. For example, the viscosified remedial fluids of the present invention may be allowed to contact the subterranean formation for a period of time sufficient to reduce their viscosity. In some embodiments, the viscosified remedial fluids of the present invention may be allowed to contact hydrocarbons, formations fluids, and/or subsequently injected fluids, thereby reducing the viscosity of the viscosified remedial fluid. After a chosen time, the viscosified remedial fluids of the present invention may be recovered through the well bore that penetrates the subterranean formation.

To facilitate a better understanding of the present invention, the following examples of certain aspects of some embodiments are given. In no way should the following examples be read to limit, or define, the entire scope of the invention.

Example

The following sample fluid was prepared in water: 1% HCl, 5 lb/Mgal SP™ breaker agent (an oxidizer breaker commercially available from Halliburton Energy Services, Duncan, Okla.) or 1-2 lb/Mgal GBW-30™ breaker (an enzyme breaker commercially available from Halliburton Energy Services, Duncan, Okla.), 50 lb/Mgal ammonium bifluoride, 50 lb/Mgal boric acid, 1-2 gal/Mgal HAI-OS™ corrosion inhibitor, and 5% MIRATAINE BET-O 30™ surfactant (an oleamidopropyl betaine commercially available from Rhodia, Inc., Cranbury, N.J.). The viscosity of this sample fluid was measured at room temperature using a Farm 35A viscometer. At 300 rpm, the fluid gave a dial reading of 35. At 600 rpm, the fluid gave a dial reading of 43.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method comprising:
   introducing a first remedial fluid into a first portion of a subterranean formation, wherein the first remedial fluid comprises a base fluid and a viscosifying agent,
      wherein the viscosifying agent comprises a sorbitan ester;
   introducing a second remedial fluid that comprises an oxidizer to the subterranean formation, the second remedial fluid being introduced to the subterranean formation subsequent to the first remedial fluid; and
   diverting at least a portion of the second remedial fluid to a second portion of the subterranean formation with the first remedial fluid.

2. The method of claim 1 wherein the first remedial fluid is foamed.

3. The method of claim 1 wherein the oxidizer is a peroxide generating compound, a peroxide, a salt of a perborate, a salt of a permanganate, a salt of a percarbonate, a salt of a hypochlorite, a salt of a chlorite, a salt of a persulfate, or a combination thereof.

4. The method of claim 1 wherein the first remedial fluid further comprises an oxidizer.

5. The method of claim 4 wherein the oxidizer is a peroxide generating compound, a peroxide, a salt of a perborate, a salt of a permanganate, a salt of a percarbonate, a salt of a hypochlorite, a salt of a chlorite, a salt of a persulfate, or a combination thereof.

6. The method of claim 4 wherein the oxidizer in the first remedial fluid is different from the oxidizer in the second remedial fluid.

7. The method of claim 1 wherein damage is present in the subterranean formation, the damage comprising at least one component selected from the group consisting of a gel residue, an asphaltene, a paraffin, a bacterial slime, scale, pipe dope, grease, heavy oil, and combinations thereof.

8. The method of claim 1 wherein the second remedial fluid is a viscosified remedial fluid.

9. The method of claim 1 wherein the oxidizer is present in the second remedial fluid in an amount of from about 0.01% to about 10% by weight of the second remedial fluid.

10. The method of claim 1, wherein the first remedial fluid further comprises at least one additional viscosifying agent selected from the group consisting of a gelling agent, and a gas in combination with a foaming agent.

11. A method comprising:
    introducing a first remedial fluid into a first portion of a subterranean formation, wherein the first remedial fluid comprises a base fluid, an oxidizer, and a viscosifying agent comprising a sorbitan ester;
    introducing a second remedial fluid that comprises a sodium hypochlorite oxidizer to the subterranean formation, the second remedial fluid being introduced to the subterranean formation subsequent to the first remedial fluid; and
    diverting at least a portion of the second remedial fluid to a second portion of the subterranean formation with the first remedial fluid.

12. The method of claim 11 wherein the oxidizer is a peroxide generating compound, a peroxide, a salt of a perborate, a salt of a permanganate, a salt of a percarbonate, a salt of a hypochlorite, a salt of a chlorite, a salt of a persulfate, or a combination thereof.

13. The method of claim 11 wherein the oxidizer in the first remedial fluid is different from the oxidizer in the second remedial fluid.

14. A method comprising:
    introducing a first remedial fluid into a first portion of a subterranean formation having damage present therein, the damage comprising at least one component selected from the group consisting of a gel residue, an asphaltene, a paraffin, scale, pipe dope, grease, heavy oil, and combinations thereof;
       wherein the first remedial fluid comprises a base fluid and a viscosifying agent,
          wherein the viscosifying agent comprises a sorbitan ester;
    introducing a second remedial fluid that comprises an oxidizer to the subterranean formation, the second remedial fluid being introduced to the subterranean formation subsequent to the first remedial fluid; and diverting at least a portion of the second remedial fluid to a second portion of the subterranean formation with the first remedial fluid.

15. The method of claim 14, wherein the first remedial fluid further comprises at least one additional viscosifying agent selected from the group consisting of a gelling agent, and a gas in combination with a foaming agent.

* * * * *